United States Patent
Agorreta Malumbres et al.

(10) Patent No.: US 10,998,733 B2
(45) Date of Patent: May 4, 2021

(54) POWER CONVERSION SYSTEM AND ASSOCIATED CONTROL METHOD

(71) Applicant: INGETEAM POWER TECHNOLOGY, S.A., Bizkaia (ES)

(72) Inventors: Juan Luis Agorreta Malumbres, Sarriguren (ES); Roberto Gonzalez Senosiain, Sarriguren (ES); Julian Balda Belzunegui, Sarriguren (ES); Alvaro Miranda Ordobas, Sarriguren (ES)

(73) Assignee: INGETEAM POWER TECHNOLOGY, S.A., Bizkaia (ES)

( * ) Notice: Subject to any disclaimer, the term of this patent is extended or adjusted under 35 U.S.C. 154(b) by 0 days.

(21) Appl. No.: 16/628,500

(22) PCT Filed: Jul. 4, 2017

(86) PCT No.: PCT/ES2017/070483
§ 371 (c)(1),
(2) Date: Jan. 3, 2020

(87) PCT Pub. No.: WO2019/008194
PCT Pub. Date: Jan. 10, 2019

(65) Prior Publication Data
US 2020/0161869 A1    May 21, 2020

(51) Int. Cl.
*H02J 3/46* (2006.01)
*H02M 7/44* (2006.01)
*H02M 1/12* (2006.01)

(52) U.S. Cl.
CPC ............ *H02J 3/46* (2013.01); *H02M 7/44* (2013.01); *H02M 2001/123* (2013.01)

(58) Field of Classification Search
CPC ....... H02J 3/46; H02M 7/44; H02M 2001/123
See application file for complete search history.

(56) References Cited

U.S. PATENT DOCUMENTS

| | | | |
|---|---|---|---|
| 2013/0200712 A1* | 8/2013 | Borup | ................ H02J 3/383 307/80 |
| 2013/0234524 A1* | 9/2013 | Balda Belzunegui | ............... H02M 7/493 307/82 |

(Continued)

FOREIGN PATENT DOCUMENTS

| | | |
|---|---|---|
| EP | 2 364 522 A1 | 9/2011 |
| EP | 2 622 702 A2 | 8/2013 |

(Continued)

OTHER PUBLICATIONS

T. Kerekes, et al., "Common Mode Voltage in case of Transformerless PV Inventers Connected to the Grid", IEEE, 2008, pp. 2390-2395.

(Continued)

*Primary Examiner* — Daniel Kessie
(74) *Attorney, Agent, or Firm* — Sughrue Mion, PLLC (57) ABSTRACT

Power conversion systems and an associated control methods are disclosed. The system includes a plurality of converters connected in parallel on an AC side, each converter includes an AC side for being coupled to a power grid, a DC side for being coupled to a DC source, and a first terminal and a second terminal on said DC side. The outputs on the AC side of all the converters are connected to a common output point, the first terminals of the different converters of the system being grounded, and the second terminals of said converters being independent to one another. Each source is therefore adapted and configured to work independently of the rest of the sources.

18 Claims, 8 Drawing Sheets

(56) References Cited

U.S. PATENT DOCUMENTS

2016/0380589 A1* 12/2016 Morita ................ G01R 31/50
    324/509
2019/0334346 A1* 10/2019 Kawai ................ H02M 7/493

FOREIGN PATENT DOCUMENTS

| EP | 2 742 588 A1 | 6/2014 |
|---|---|---|
| WO | 2010/051812 A1 | 5/2010 |
| WO | 2012/041317 A2 | 4/2012 |
| WO | 2013/024496 A1 | 2/2013 |

OTHER PUBLICATIONS

Zhihong Ye, et al., "Control of Circulating Current in Two Parallel Three-Phase Boost Rectifiers", IEEE Transactions on Power Electronics, Sep. 2002, pp. 609-615, vol. 17, No. 5.
International Search Report for PCT/ES2017/070483 dated Apr. 20, 2018 (PCT/ISA/210).
Written Opinion for PCT/ES2017/070483 dated Apr. 20, 2018 (PCT/ISA/237).

* cited by examiner

(related art)

Fig. 1a

(related art)

Fig. 1b

(related art)

Fig. 1c

(related art)

Fig. 1d

(related art)

Fig. 2a

(related art)

Fig. 2b

(related art)

Fig. 2c

(related art)

Fig. 2d

(related art)

Fig. 3a

(related art)

POWER CONVERSION SYSTEM AND ASSOCIATED CONTROL METHOD

CROSS REFERENCE TO RELATED APPLICATIONS

This application is a National Stage of International Application No. PCT/ES2017/070483 filed Jul. 4, 2017.

TECHNICAL FIELD

The present application relates to power conversion systems comprising a plurality of converters connected in parallel on the AC side, and associated control methods.

RELATED ART

Power converters are used in many instances for generating electric energy and for providing AC energy to a load, such as a motor or a power grid, for example. In some instances, mainly due to the high power requirements, there is a need to connect a plurality of converters to one another in order to be able to provide the required electric energy. Furthermore, in some cases such as, for example, in an installation for generating electric energy from sunlight (photovoltaic installations), converters receive DC current and convert it into AC current, said converters being known as inverters.

A low-frequency transformer has conventionally been included in installations of this type between the inverter and the power grid, providing galvanic isolation between the installation and the grid. Furthermore, this transformer can be used to increase inverter output voltage, if required.

The inverter is made up of switching power transistors which convert the DC current provided by the photovoltaic generator or the corresponding source into an AC current that is injected into the power grid.

Figure 1A:
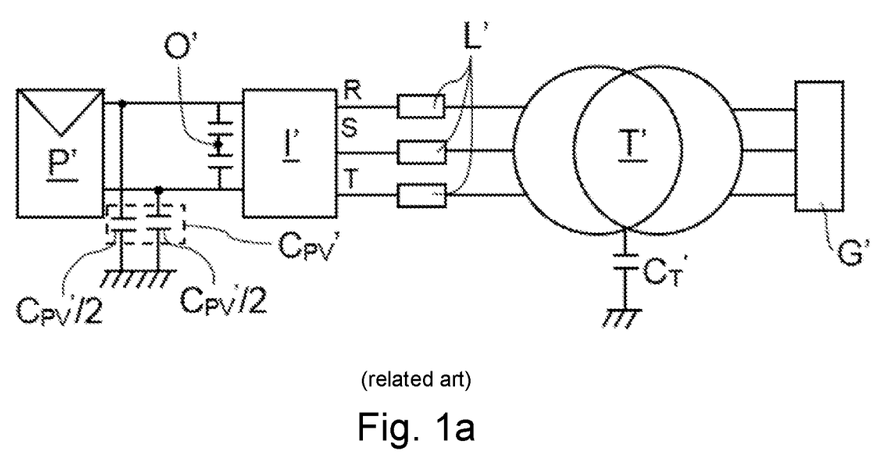
FIG. 1a schematically shows a photovoltaic installation of the prior art comprising a transformer for connection to a power grid, where the parasitic capacitances of the panel comprised in said installation and of the transformer are further depicted.

As can be seen in FIG. 1a, which depicts a photovoltaic installation (or a photovoltaic system) of the prior art, the photovoltaic generator (depicted by way of a panel P') has a parasitic capacitance $C_{PV}'$ with respect to ground, where the capacitance between ground and each of the positive and negative terminals is equal to half of said parasitic capacitance $C_{PV}'$. The parasitic capacitance $C_{PV}'$ is proportional to the surface of the corresponding panel P', and therefore to the power of the photovoltaic generator. The panel P' is a DC source and the installation comprises an inverter I' for converting the DC current provided by the source into an AC current, said inverter I' comprising three R, S and T phases on the AC side. The inverter I' is connected to a grid G' through at least one element, such as a transformer T', and the transformer T' has a parasitic capacitance $C_T'$ with respect to ground. FIG. 1a further depicts the inductance L' of each of the lines between the inverter I' and the transformer T' (one line per phase R, S, T).

Figure 1B:
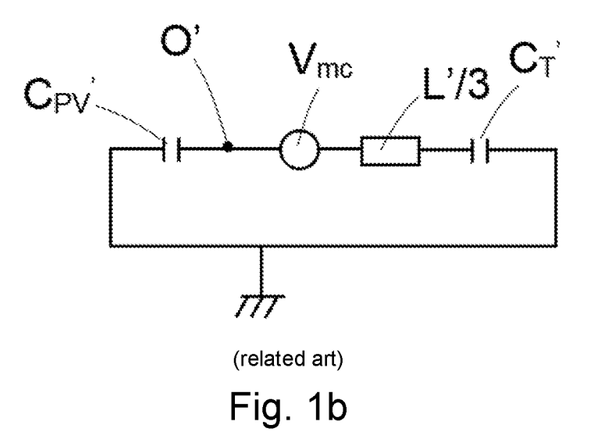

The entire system of FIG. 1a can be reduced to an equivalent simplified common-mode system like the one shown in FIG. 1b. The common-mode voltage Vcm is the arithmetic mean of the sum of the voltages of the R, S and T outputs on the AC side of the converter I' measured with respect to a common reference point (in this case a midpoint O' on the DC side of the inverter I'), as indicated in the following equation:

$$Vcm = \frac{V_{RO'} + V_{SO'} + V_{TO'}}{3},$$

where:
- $V_{RO'}$: voltage between phase R and the midpoint O'.
- $V_{SO'}$: voltage between phase S and the midpoint O'.
- $V_{TO'}$: voltage between phase T and the midpoint O'.
- $V_{cm}$: common-mode voltage of the inverter I'.

The calculation on the common-mode voltage is also explained, for example, in document "*Common-mode Voltage in case of Transformerless PV inverters Connected to the Grid*, T. Kerekes et al., 2008 *IEEE*", incorporated herein by reference to obtain and explain the concept of common-mode voltage.

Parasitic ground currents are therefore limited by the impedances of the circuit depicted in FIG. 1b, where the largest of said impedances represents the parasitic capacitance $C_T'$ of the transformer T'.

Figure 1C:
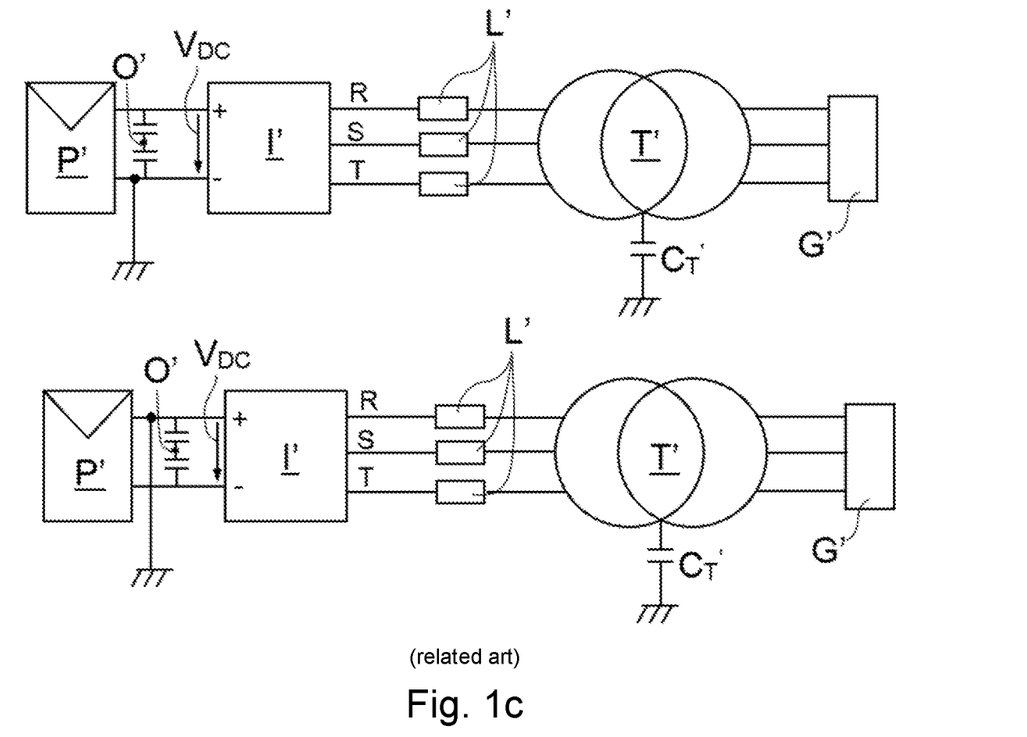
FIG. 1c schematically shows two photovoltaic installations of the prior art comprising a transformer for connection to a power grid, where one installation has the negative terminal on the DC side of the converter grounded (top) and the other has the positive terminal on the DC side of the converter grounded (bottom).
Figure 1D:
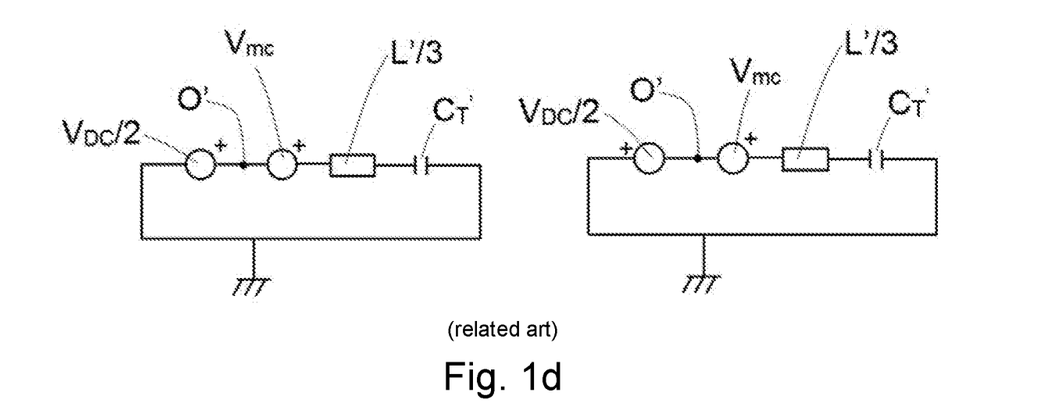
FIG. 1d shows an equivalent simplified common-mode diagram of the photovoltaic installations of FIG. 1c (the negative terminal is shown to be grounded on the left-hand side, and the positive terminal is shown to be grounded on the right-hand side).

It is sometimes required to ground the positive terminal or the negative terminal on the DC side of the inverter. This is due, for example, to regulatory requirements (for safety reasons) or to the fact that some photovoltaic panel technologies undergo electrochemical degradations that are prevented if one of said terminals is grounded. FIG. 1c shows two cases of grounded systems of the prior art, where the negative terminal is grounded in one of them (top) and the positive terminal is grounded in the other (bottom). In these cases, the effect of the parasitic capacitance $C_{CP}'$ of the panel P' is eliminated since there is a direct connection between one of the terminals and ground, and the parasitic currents through ground are also greatly limited by the large impedance representing the parasitic capacitance $C_T'$ of the transformer T', as can be deduced from FIG. 1d which shows the equivalent circuit of the two cases of FIG. 1c (on the left-hand side for the case in which the negative terminal is grounded, and on the right-hand side for the case in which the positive terminal is grounded).

Figure 2A:
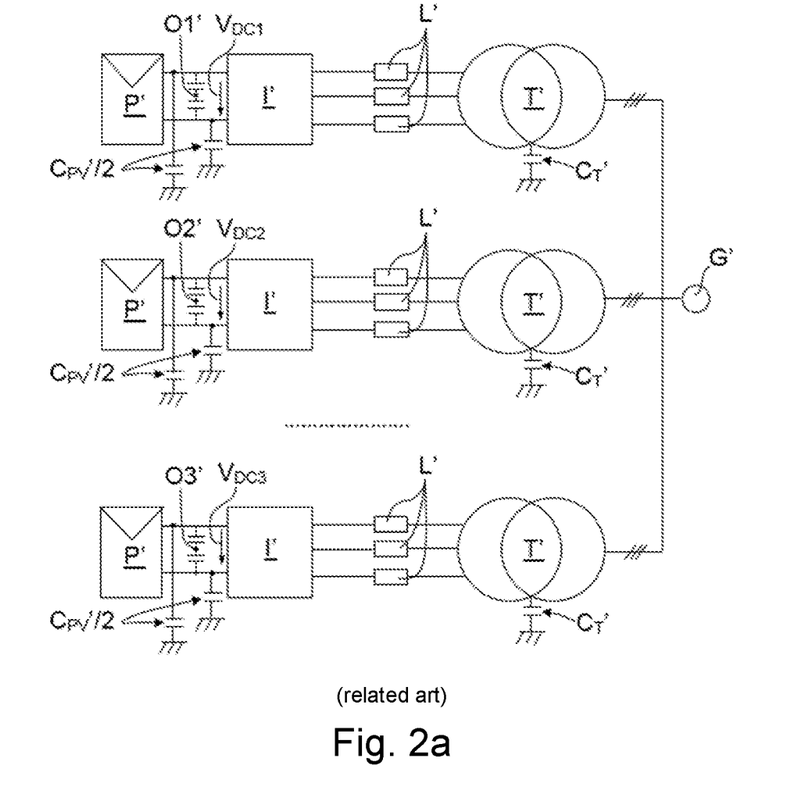
FIG. 2a schematically shows a photovoltaic installation of the prior art comprising a plurality of converters and a transformer with independent galvanic isolation for each converter, and without grounding the DC side.
Figure 2B:
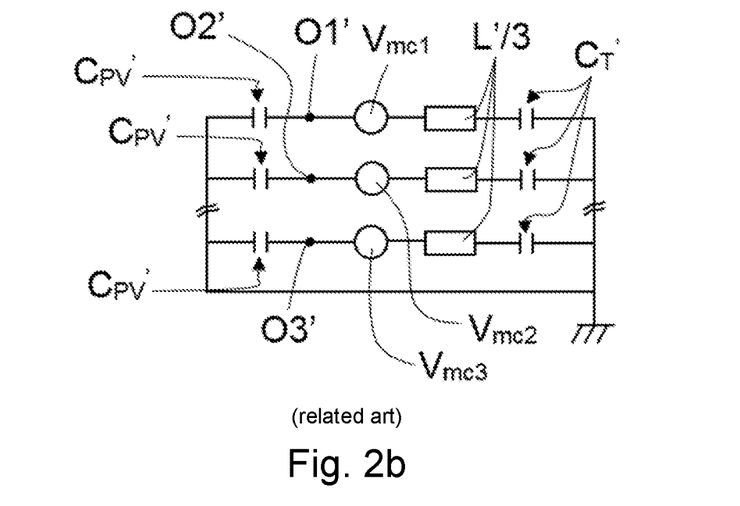
Figure 2C:
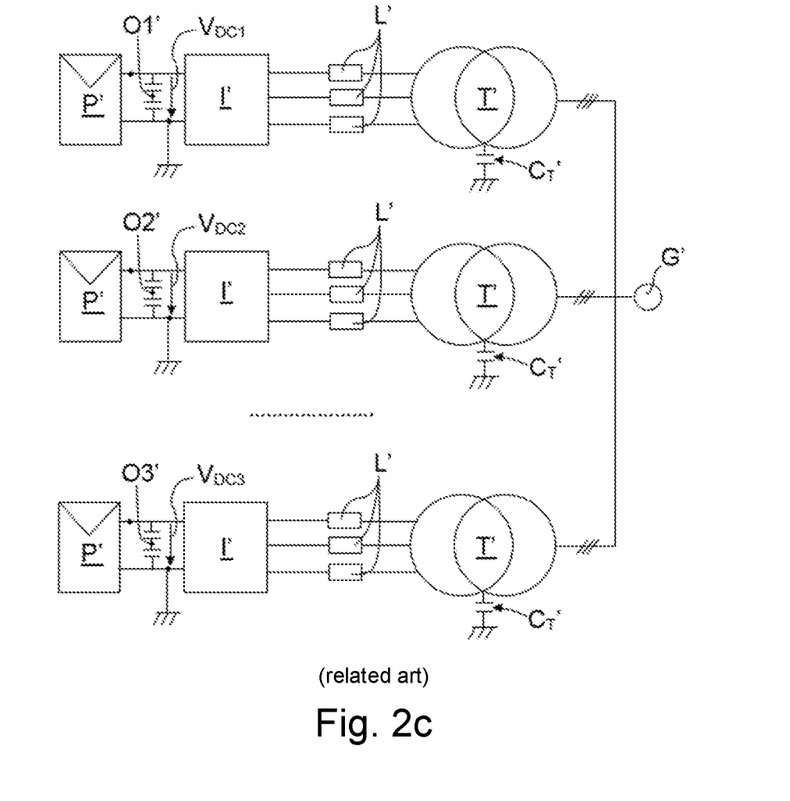
FIG. 2c schematically shows a photovoltaic installation of the prior art comprising a plurality of converters and a transformer with independent galvanic isolation for each converter, where one of the terminals on the DC side of the converters is grounded.
Figure 2D:
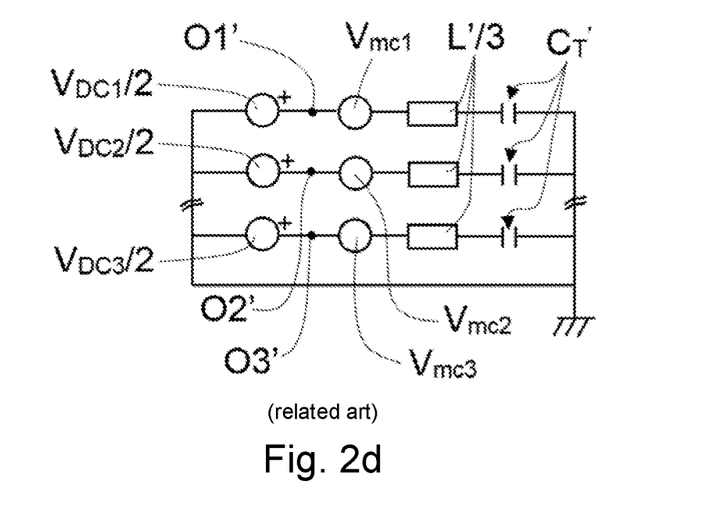
FIG. 2d shows an equivalent simplified common-mode diagram of the photovoltaic installation of FIG. 2c.

Generally, high-power installations are formed by a plurality of inverters I', each of them with its transformer T' and photovoltaic generator, working in parallel with respect to the same grid G', as shown in FIG. 2a, each inverter I' comprising, on the DC side, a corresponding midpoint O1', O2', O3' and a corresponding DC voltage $V_{DC1}$, $V_{DC2}$ and $V_{DC3}$. Under these conditions, the entire system can be reduced to its equivalent simplified common-mode system shown in FIG. 2b which depicts the common-mode voltage $V_{cm1}$, $V_{cm2}$ and $V_{cm3}$ associated with each of the inverters I'. FIGS. 2c and 2d show the version grounded on the DC side of this system. In said FIGS. 2c and 2d, the negative terminal is grounded but the diagram would also be valid for the grounding of the positive terminal (changing only the sign of the voltage $V_{DC}/2$ depicted in said figures).

A solution to reduce installation costs is to replace the transformer associated with each inverter with a single transformer comprising a primary winding for each inverter and a single secondary which is connected to the grid. In this case, the parasitic currents obtained in the equivalent common-mode circuit are similar to placing independent transformers for each of the inverters, as shown in FIGS. 2a to 2d. However, transformers of this type are more expensive and hard to make, so there is still a need to search for a more optimal solution, for example, using a single primary for all the inverters.

Figure 3A:
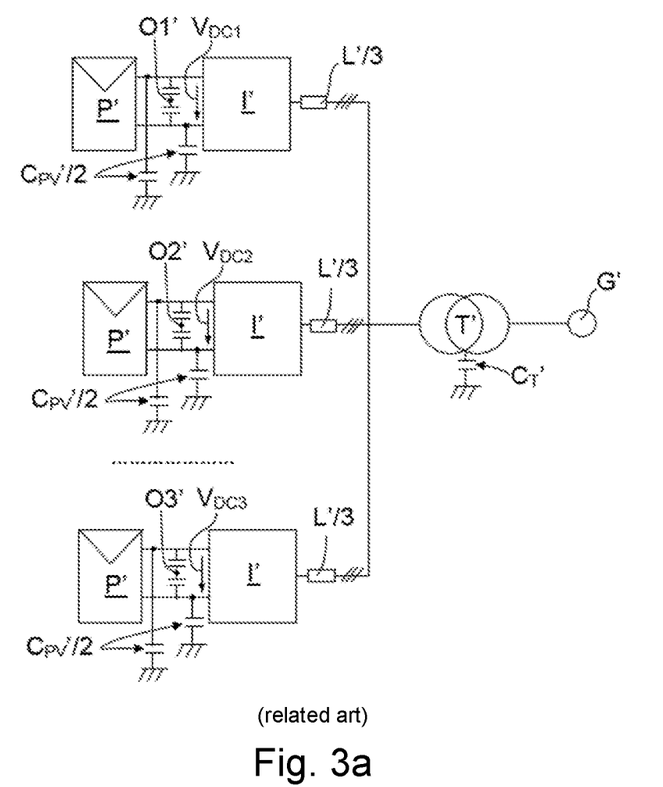
FIG. 3a schematically shows a photovoltaic installation of the prior art comprising a plurality of converters, without grounding on the DC side, and a single transformer for all the converters.
Figure 3B:
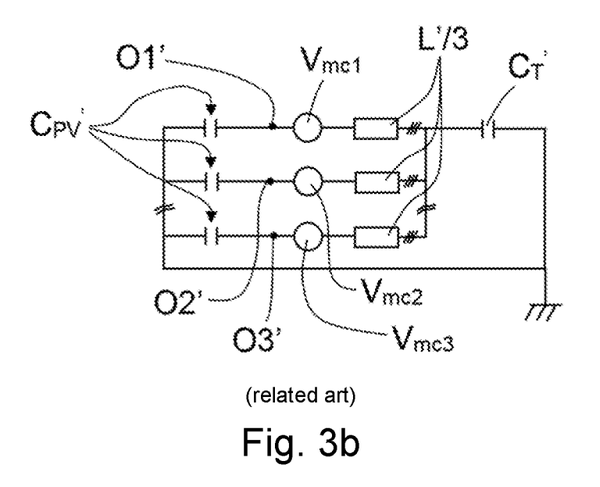

This alternative solution is shown in a simplified manner in FIG. 3a, where an ground-isolated connection diagram is used in the part of the inverters I'. Installations of this type improve efficiency features and reduce the cost thereof, however, eliminating the transformers associated with each inverter I' brings about a new common-mode circuit because, in order to be connected to a single primary, the AC side of all the inverters I' are connected to the same point (each phase of an inverter with its corresponding phase of the rest of the inverters), without intermediate elements.

Two types of currents can exist in the circuits depicted in FIGS. 2b, 2d, 3b, and 3d: parasitic ground currents through the parasitic capacitance $C_T'$ of the transformer T', and currents between the inverters I'. Both currents are limited by the impedances representing the capacitance $C_T'$ of the transformer T' and the capacitance $C_{PV}'$ of the panel P', respectively. Depending on the circuit, the currents change mainly between the inverters I', for example, in the circuits of FIGS. 3b and 3d, the impedance of the current between the inverters I' is reduced as they must not cross the parasitic capacitance of the transformer T'.

Figure 3C:
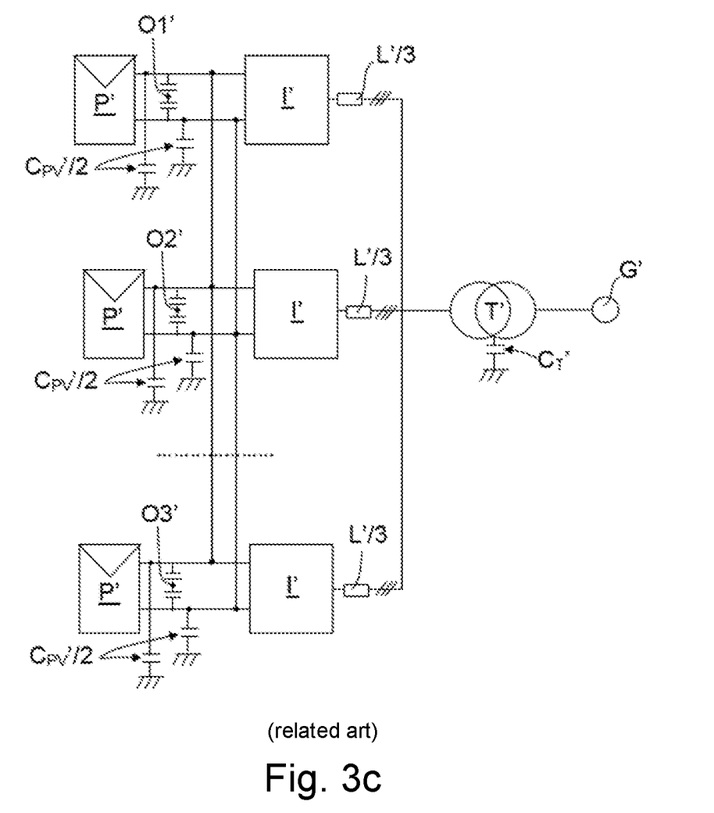
FIG. 3c schematically shows a photovoltaic installation of the prior art comprising a plurality of converters, without grounding on the DC side, and a single transformer for all the converters, with the positive terminals on the DC side of the inverters attached to one another and the negative terminals on the DC side of the inverters attached to one another.
Figure 3D:
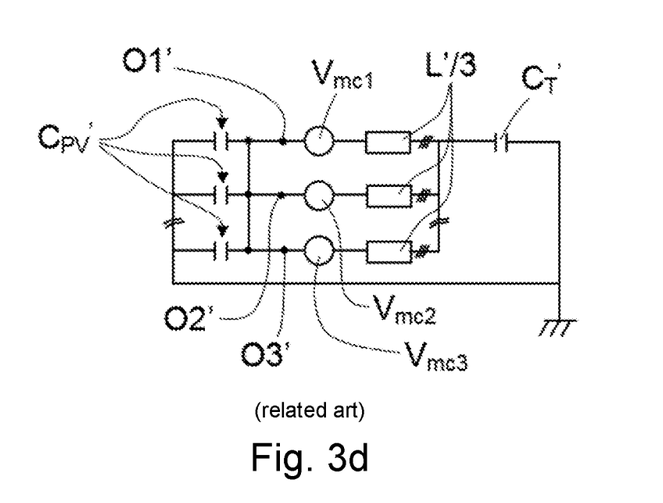
FIG. 3d shows an equivalent simplified common-mode diagram of the photovoltaic installation of FIG. 3c.

In the related art, when the inverters attached to the same winding are to be grounded the DC side of the inverters must be connected in parallel (attaching negative terminals to one another and positive terminals to one another), as depicted in FIG. 3c, the equivalent circuit of which is shown in FIG. 3d. As can be seen in the equivalent circuit, in this case the parasitic capacitances $C_{PV}'$ of the panels P' are short-circuited due to grounding. Short-circuiting said parasitic capacitances $C_{PV}'$ causes the reduction of the impedance of the current path between the inverters (zero-sequence currents) which can be controlled as described, for example, in Zhiong Ye's article "*Control of Circulating Current in Two Parallel Three-Phase Boost Rectifiers*", *IEEE* Vol. 17, no. 5, September 2002. The method described in this article implements a zero-sequence current control which is applied to all the inverters except for one. The currents of each phase on the AC side of each of the inverters are measured and said measurements are added up, the result of the sum being used as input for an integral proportional controller. The output of the integral proportional controller is added to the control of currents injected into the grid in order to apply the result of the sum to the modulation used for controlling the inverters.

SUMMARY

Certain embodiments of the invention can provide a power conversion system comprising a plurality of converters connected in parallel on the AC side, and an associated control method, as defined in the claims.

The power conversion system comprises a plurality of converters connected in parallel on the AC side, and a DC source coupled to a DC side of each converter. Each converter comprises an AC side for being coupled to a power grid (directly or through a transformer, for example), a first terminal and a second terminal on the DC side and an AC terminal for each phase arranged on the AC side.

All the AC terminals of one and the same phase of all the converters are connected to a common AC point (by phases), preferably without using intermediate elements such as a transformer, for example. The first terminals of the different converters of the system are grounded, where they are thereby attached to one another, and the second terminals of said converters are independent of one another (not connected to one another) and not grounded.

Therefore, by attaching a single terminal on the DC side of the converters therebetween, each converter can comprise different DC voltages between its two terminals on the DC side and each source can work independently of the rest of the sources, where the sources in the system are therefore adapted and configured for working independently of one another. This entails a huge advantage with respect to the systems of the prior art, such as for example, with respect to the systems in which the converters thereof comprise positive terminals that are attached to one another as well as negative terminals, given that in said systems all the DC sources are associated in parallel and a maximum power point tracking (MPPT) is present, where the ability of said sources to operate at the maximum operating point is not assured.

In the proposed system, the capacitance of each of the DC sources (for example, a photovoltaic panel) is utilized, given that the DC voltage which it can supply to its converter does not depend on the DC voltage that the rest of the sources can supply.

Furthermore, another additional advantage is that a failure in any of the sources or in any of the converters associated with the different sources does not entail a failure of the system, given the aforementioned independence obtained in said system.

A second aspect relates to a control method for a power conversion system, comprising a plurality of converters connected in parallel on an AC side and a DC source coupled to a DC side of each converter, and each converter comprising an AC side for being coupled to a power grid, a first terminal and a second terminal arranged on the DC side and coupled to a corresponding source, where one of said terminals is the positive terminal and the other terminal is the negative terminal, and an AC terminal for each phase arranged on the AC side, where the AC terminals of one and the same phase arranged on the AC side of all the converters are connected to a common AC point, without using intermediate elements. The method is configured for being dynamically implemented in a system where the first terminals of the different converters of said system are grounded and where the second terminals of said converters are independent of one another. The method is also configured for controlling each source independently of the rest of the sources, the capacitance of each of the sources being able to be utilized. The same advantages described for the first aspect are obtained with the method.

These and other advantages and features of the invention will become evident in view of the figures and detailed description of embodiments of the invention.

BRIEF DESCRIPTION OF THE DRAWINGS

FIG. 1b shows an equivalent simplified common-mode diagram of the photovoltaic installation of FIG. 1a.

FIG. 2b shows an equivalent simplified common-mode diagram of the photovoltaic installation of FIG. 2a.

FIG. 3b shows an equivalent simplified common-mode diagram of the photovoltaic installation of FIG. 3a.

FIG. 4b shows the equivalent circuit of the system of FIG. 4a.

DETAILED DESCRIPTION

Figure 4A:
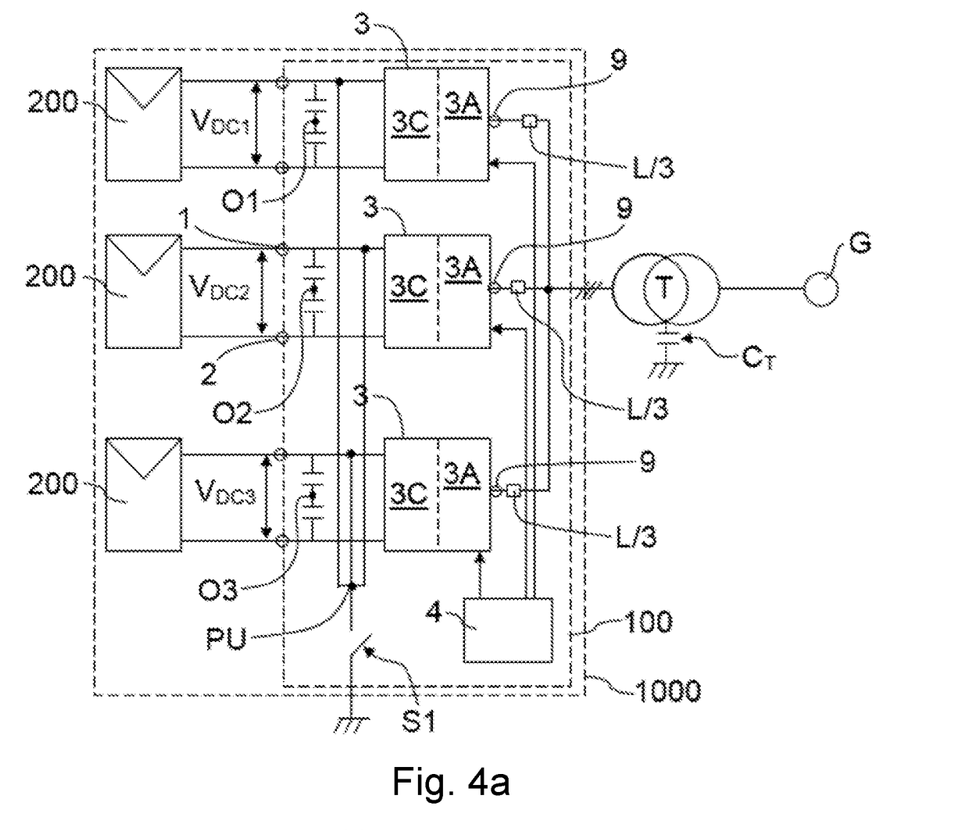
FIG. 4a schematically shows an embodiment of the power conversion system of the invention, with the positive terminal of the converters grounded.
Figure 4B:
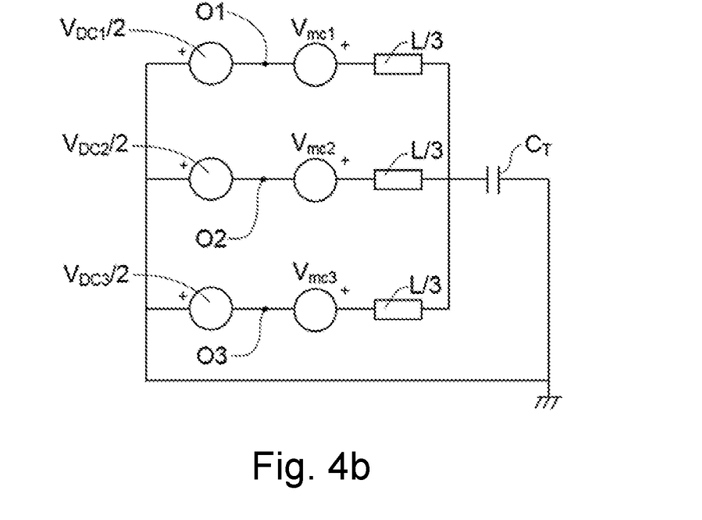
Figure 4C:
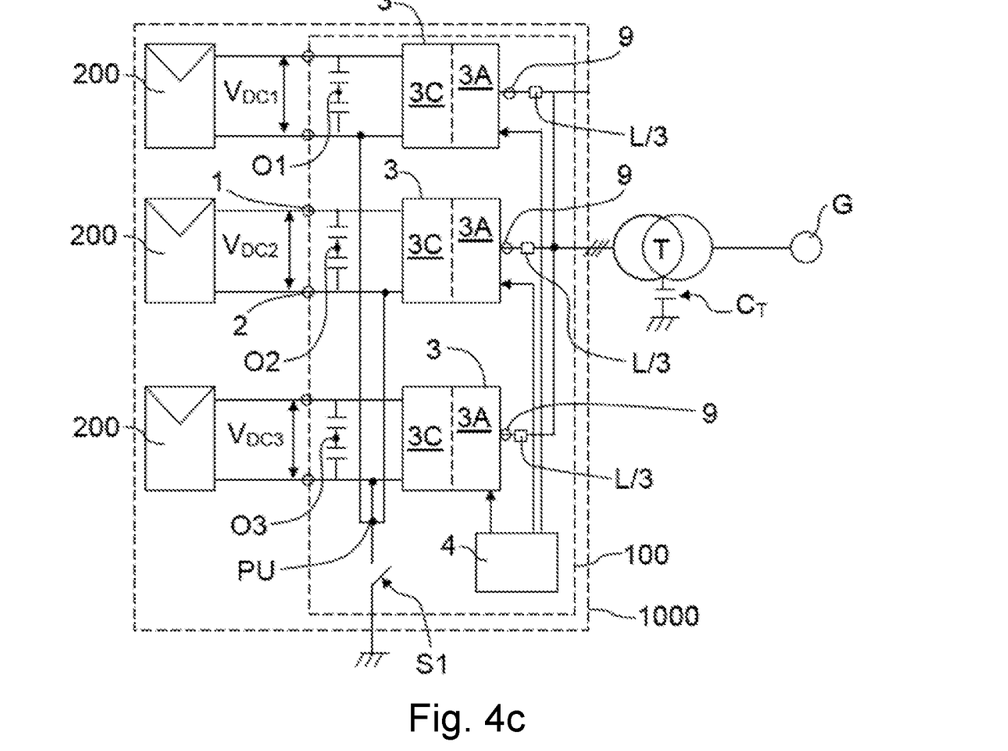
FIG. 4c schematically shows an embodiment of the power conversion system of the invention, with the negative terminal of the converters grounded.

A first aspect of an embodiment of the invention relates to a power conversion system 100, such as the one shown by way of example in FIGS. 4a and 4c, for providing electric power to a load G, such as a motor or a power grid, from a plurality of DC sources 200, such as photovoltaic generators.

Figure 4D:
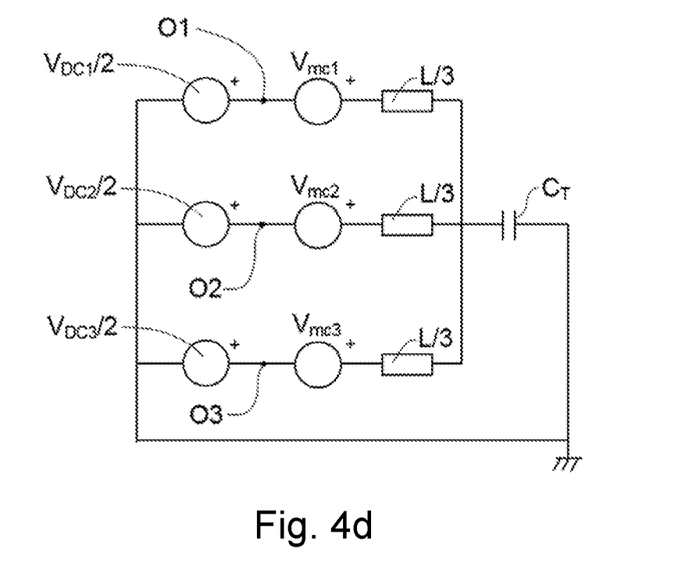
FIG. 4d shows the equivalent circuit of the system of FIG. 4c.

The system 100 comprises a plurality of converters 3 connected in parallel on the AC side for converting a DC voltage from the sources 200 into an AC voltage for the load G, and each converter 3 comprises an AC side 3A for being coupled to the load G (for example, directly or through a transformer T as depicted in FIGS. 4a and 4c) and a DC side 3C for being coupled to a respective source 200, such as a photovoltaic generator if the system 100 belongs to a photovoltaic installation 1000. Each source 200 generates a DC voltage, and the corresponding converter 3 converts it into an AC voltage to power the load G. The embodiments of FIGS. 4a and 4c show a system 100 with three inverters 3, each of them comprising a respective DC voltage $V_{DC1}$, $V_{DC2}$ and $V_{DC3}$ and a respective midpoint O1, O2 and O3 on its DC side 3C, but a system 100 can comprise as many inverters 3 are required. FIGS. 4b and 4d depicts an equivalent circuit of the systems of FIGS. 4a and 4c, respectively, furthermore depicting the parasitic capacitance $C_T$ of the transformer T, the line inductance L of each converter 3, between said converter 3 and the transformer T, the voltage $V_{DC}1$, $V_{DC2}$ and $V_{DC}3$ and the common-mode voltage $V_{cm1}$, $V_{cm2}$ and $V_{cm3}$ in each case. The figures do not show any filter connected between the AC side 3A of the inverters 3 and the transformer T, but one such filter (of the required topology: LC, LCL, etc.) could be connected is required.

Each converter 3 comprises on the DC side 3C a first terminal 1 and a second terminal 2, one of them being the positive terminal and the other being the negative terminal, the terminals comprising therebetween the corresponding DC voltage $V_{DC1}$, $V_{DC2}$ and $V_{DC3}$. Each inverter 3 comprises on the AC side an AC terminal 9 for each AC phase, three phases in the case of a three-phase system (like the one shown in the figures, and there are therefore three AC terminals 9, although the drawing shows the three-phase AC side in a single row and an AC terminal 9 is depicted in each case).

The first terminals 1 of the different converters 3 of the system 100, which can be the positive or negative terminals, are attached to one another and grounded. FIG. 4a shows an embodiment with the positive terminals grounded, and FIG. 4c shows an embodiment with the negative terminals grounded. However, the second terminals 2 of said converters 3 (negative terminals in the case of FIG. 4a, and positive terminals in the case of FIG. 4c) are kept independent of one another. In the embodiments shown in the figures, the first terminals 1 are attached to an attachment point AP, and this attachment point AP is grounded (preferably through a switch S1, as shown in the figures). In other embodiments, each of the first terminals 1 is grounded independently (through a respective switch, or directly), where said first terminals 1 are therefore attached to one another by means of grounding.

In other embodiments not depicted in the figures, the grounding of a first terminal 1 can also be performed at least through an impedance, for example, through a resistive impedance. The impedance may be connected between the first terminal 1 and earth, and, if a switch S1 is present, between the first terminal 1 and the switch S1 or between the switch S1 and earth.

Each converter 3 is coupled or connected on the DC side 3C thereof to a source 200, and due to the independence between the second terminals 2 (or the first terminals 1) of the different converters 3, each power source 200 can operate independently of the rest of the sources 200. In this manner, each source 200 in the system 100 is adapted and configured to work independently of the rest of the sources 200, the power of each source 200 therefore being able to be fully utilized when required, without the limitation of one of them negatively affecting (either due to weather conditions or operating conditions) the rest (in terms of limiting their power), as occurs in the prior art. Being configured and adapted to operate independently must be interpreted as each source 200 being able to do without the DC voltage generated by the rest of the sources 200 at any given time, the power that can be produced by a source 200 not having to be limited due to limitations derived from other sources 200.

The system 100 comprises a control device 4 configured for dynamically (and repeatedly) determining or calculating the value of the arithmetic mean of the voltages of the AC terminals 9 of each converter 3 with respect to the same reference point. Said reference point is preferably a common point which all the converters 3 share, such as the grounded point, for example. In a preferred embodiment of the system 100, the reference point is the first terminal 1 in each case. The control device 4 is further configured for dynamically (and repeatedly) comparing said determined values, determining if they are equal, and for making said values equal to a determined value if it determines that they are not equal. The determined value to which the aforementioned values are made equal can be one of the values of the arithmetic means determined by the control device 4, for example, or any other value deemed appropriate in each case. Making said values (the arithmetic means) equal allows all the converters 3 to be able to convert DC voltages $V_{dc}$ into AC voltages.

In the systems with more than one phase, such as a three-phase system, for example, in the calculation of the arithmetic mean of the voltages of the AC terminals 9 of a converter 3, the AC components of said AC voltages cancel each other out, due to the phase difference between them. However, the same does not occur with the DC component, such that the arithmetic mean actually reflects the mean between the DC components of said AC voltages. However, in a single-phase system the AC components do not cancel one another, and for this case, arithmetic mean must be understood as referring to the DC component of the AC voltage in the only AC terminal 9 of the corresponding converter 3.

The arithmetic mean value common to all the converters 3 is greater than or equal to half the minimum DC voltage $V_{DC}$ required at the input of the converters 3, so that these converters can correctly convert said voltage $V_{DC}$ into an AC voltage (rectified voltage $V_{dcrec}$):

$$Vdc_{rec} = \sqrt{2}\sqrt{3} \cdot Vf,$$

where $V_f$ is the phase voltage on the AC side 3A.

The fact that the converters 3 require a minimum DC voltage on their DC side 3C so that they can convert it into an AC voltage in a controlled manner is known, and which is the minimum DC voltage in each case (depending on the configuration of the converter 3 at hand) is also known, so this aspect is not described in more detail. With this lower limitation of the common arithmetic mean it is assured that all the converters 3 are capable of converting the DC voltages $V_{DC}$ into AC voltages.

In a preferred embodiment, the system 100 comprises at least one detection device, not depicted in the figures, adapted for measuring the DC voltage $V_{DC}$ between the two terminals 1 and 2 on the DC side 3C of each converter 3. The detection device can comprise a sensor for each measurement to be taken, but in other embodiments where batteries act as the sources 200, for example, it is also possible to know said voltages $V_{DC}$ beforehand without having to measure them (without requiring a detection device). The control device 4 is communicated with the detection device for receiving said measurements and is configured for obtaining the arithmetic mean of the voltages of the AC terminals 9 of each converter 3, depending on said measured DC voltages $V_{DC}$ and on the common-mode voltage $V_{cm}$ of each converter 3. The corresponding common-mode voltages $V_{cm}$ are generated by the system 100 itself, as they are known. In particular, the arithmetic mean associated with each converter 3 is preferably obtained from the following equations in each case:

When the first grounded terminals 1 are positive terminals (FIG. 4b):

$$Vmed(p) = V_{cm} + \frac{V_{DC}}{2},$$

When the first grounded terminals 1 are negative terminals (FIG. 4d):

$$Vmed(n) = V_{cm} - \frac{V_{DC}}{2},$$

where:
$V_{med(p)}$: arithmetic mean associated with a converter 3, with the positive terminal grounded.
$V_{med(n)}$: arithmetic mean associated with a converter 3, with the negative terminal grounded.
$V_{cm}$: common-mode voltage of said converter 3.
$V_{DC}$: DC voltage between the terminals 1 and 2 on the DC side of said converter 3.

In a preferred embodiment, the control device 4 is further configured for dynamically (and repeatedly) comparing the measured DC voltages $V_{DC}$ with one another, for determining which of them is the smallest voltage and for making the arithmetic mean equal based on the measured DC voltages $V_{DC}$, taking the arithmetic mean associated with the converter 3 the DC voltage $V_{DC}$ of which is the smallest (DC voltage $V_{DCmin}$) as a reference. The voltages $V_{DC}$ at any given time (instantaneous voltages) determine the capacity of the corresponding converter 3 in terms of the voltages on its AC side 3A, such that by taking into account said voltages $V_{DC}$, each converter 3 can be acted on to adjust its arithmetic mean, if required, thereby preventing AC voltage saturation, which, if occurs, may affect both current control and even the power to be delivered to the load. The biggest risk of entering into saturation is the converter 3 with a smaller DC voltage $V_{DC}$, because it offers a smaller margin for modifying its associated arithmetic mean before reaching saturation. Therefore, taking the smallest DC voltage $V_{DC}$ from among the measurements (DC voltage $V_{DCmin}$) as a further reference, it is assured that the associated converter 3 does not enter into saturation, thereby assuring that the rest of the converters also do not enter into saturation. In this manner, a viable operation point is obtained for the system 100, something which cannot be achieved otherwise.

Preferably, furthermore, the arithmetic mean of each converter 3 is less than or equal to a maximum determined value defined by the equation $$Vmed\_max = V_{DCmin} - \frac{\sqrt{2}\sqrt{3} \, Vf}{2},$$

where:
$V_{med\_max}$: maximum value of the arithmetic mean associated with a converter 3.
$V_{DCmin}$: smallest VC voltage $V_{DC}$ from among the measurements.
$V_f$: phase voltage of the side of the power grid G.

Therefore, the arithmetic mean is preferably comprised in a range delimited between the maximum value $V_{med-max}$ and half the minimum DC voltage $V_{DC}$ required at the input of the converters 3 (half the rectified voltage $V_{dcrec}$).

In other embodiments, the system 100 comprises at least one detection device, not depicted in the figures, adapted for measuring the voltage of the AC terminal 9 corresponding to each of the phases of each converter 3, with respect to the respective reference point, and the control device 4 is communicated with said detection device for dynamically receiving said measurements, and is configured for obtaining the arithmetic mean of the voltages of the AC terminals 9 of each converter 3 from said received measurements, and also for dynamically (and repeatedly) making them equal. In said embodiments, the arithmetic mean in each case can be obtained according to the following equation:

$$Vmed = \frac{V_{RP} + V_{SP} + V_{TP}}{3},$$

where:
- $V_{med}$: arithmetic mean associated with a converter 3.
- $V_{RP}$: AC voltage in the AC terminal 9 of said converter 3 corresponding to a phase (phase R).
- $V_{SP}$: AC voltage in the AC terminal 9 of said converter 3 corresponding to a phase (phase S).
- $V_{TP}$: AC voltage in the AC terminal 9 of said converter 3 corresponding to a phase (phase T).

In any of the embodiments of the system 100 of the invention, the control device 4 is configured for making all the arithmetic means equal if it determines that they are not equal. To make said arithmetic means equal, in a preferred embodiment the control device 4 is dynamically (and repeatedly) configured for taking one of the arithmetic means as a reference and for acting on the rest of the converters 3 to cause the arithmetic means of said other converters 3 to become equal to the mean taken as a reference, as described above. In other embodiments, the control device 4 is configured for making the arithmetic means equal in a different way, such as by modifying the reference arithmetic mean, for example, and making the rest of the arithmetic means equal to said modified value, or establishing a determined arithmetic mean, based on the criteria deemed appropriate in each case, and for making all the arithmetic means equal to the established arithmetic mean. The detection device can comprise a sensor for each measurement to be taken.

In some embodiments, such as those shown in FIGS. 4a and 4c, for example, the control device 4 comprises a control unit configured for being communicated with all the converters 3, and said control unit is furthermore communicated with the detection devices of the system 100 (the detection device for measuring the voltages of the AC terminals 9 and/or the detection device for measuring the DC voltages $V_{DC}$).

In other embodiments not depicted in the figures, the control device comprises a control unit for each converter 3, where each control unit is communicated with the detection devices for receiving the measurements corresponding to the associated converter 3 thereof. The control units can be communicated to one another, such that they can identify the smallest voltage $V_{DC}$, for example.

In other embodiments not depicted in the figures, the control device 4 comprises a control unit for each converter 3, where each control unit is communicated with the detection devices for receiving the measurements corresponding to the associated converter 3 thereof, and a central control unit is communicated with all the control units associated with the converters 3. In this manner, the central control unit can, for example, receive the DC voltages $V_{DC}$ from all the converters 3, determine which of them is the smallest voltage, and determine which DC voltage $V_{DC}$ is to be established as the reference voltage so that each control unit acts on its associated converter 3 to modify, if and as appropriate, the arithmetic mean of the voltages of the corresponding AC terminals 9.

Preferably, the control device 4 of the system 100 is further configured for dynamically (and repeatedly) implementing a current control over the converters 3, acting on said converters 3 to help in eliminating the zero-sequence currents therebetween, with respect to the control described above (making the values of the arithmetic means equal). A current control of this type is described, for example, in Zhiong Ye's article "*Control of Circulating Current in Two Parallel Three-Phase Boost Rectifiers*", IEEE Vol. 17, no. 5, September 2002, and is implemented on all the converters 3 except for one.

As a general rule, each converter 3 is configured for converting the voltage $V_{DC}$ (on the DC side 3C) into an AC voltage (on the AC side 3A), and comprises a plurality of switches, not depicted in the figures, the conversion depending on the opening/closing of said switches. When the control device 4 is said to act on a converter 3, said control device 4 controls said opening/closing to perform conversion based on opening/closing signals the device itself generates. To generate the corresponding opening/closing signals, it takes into account the control whereby the arithmetic means of the voltages of the AC terminals 9 of the converters 3 are made equal (preferably, further considering the arithmetic mean associated with the converter 3 with a smaller DC voltage $V_{DC}$ as a reference) and, where appropriate, a current control such as the one that has been mentioned.

A second aspect of certain embodiments of the invention relates to a control method adapted for being implemented in a power conversion system 100 according to the first aspect of an embodiment of the invention, such that the same advantages as those described for embodiments of the system of the invention are achieved. The control method is carried out dynamically (and repeatedly). The explanations given for the first aspect of an embodiment of the invention relating to the different measurements and calculations are also valid for the second aspect, and most of them will not be expounded on further.

In any of the embodiments of the method, the arithmetic means of the voltages of the AC terminals 9 of all the converters 3 with respect to a reference point on the corresponding DC side (in all the cases with respect to one and the same reference point in the sense described for the first aspect of an embodiment of the invention) are made to be equal to a value greater than or equal to half the minimum DC voltage required at the input of the corresponding converter 3. In a preferred embodiment of the method, the reference point is the respective first terminal 1.

In some embodiments of the method, the DC voltage $V_{DC}$ between the two terminals 1 and 2 on the DC side of each converter 3 is measured, and the arithmetic mean of the voltages of the AC terminals 9 of each converter 3 is obtained depending on said measured DC voltages $V_{DC}$ and on the common-mode voltage $V_{cm}$ of each converter 3. In particular, the arithmetic mean associated with each converter 3 is preferably obtained from the following equations in each case:

When the first grounded terminals 1 are positive terminals (FIG. 4b):

$$Vmed(p) = V_{cm} + \frac{V_{DC}}{2},$$

When the first grounded terminals 1 are negative terminals (FIG. 4d):

$$Vmed(n) = V_{cm} - \frac{V_{DC}}{2},$$

where:
- $V_{med(p)}$: arithmetic mean associated with a converter 3, with the positive terminal grounded.
- $V_{med(n)}$: arithmetic mean associated with a converter 3, with the negative terminal grounded.
- $V_{cm}$: common-mode voltage of said converter 3.

$V_{DC}$: DC voltage between the terminals 1 and 2 on the DC side of said converter 3.

As an alternative, as has also been described for the first aspect of an embodiment of the invention, the arithmetic mean associated with each converter 3 can be obtained according to the following equation:

$$Vmed = \frac{V_{RP} + V_{SP} + V_{TP}}{3},$$

where:
- $V_{med}$: arithmetic mean associated with a converter 3.
- $V_{RP}$: AC voltage in the AC terminal 9 of said converter 3 corresponding to a phase (phase R).
- $V_{SP}$: AC voltage in the AC terminal 9 of said converter 3 corresponding to a phase (phase S).
- $V_{TP}$: AC voltage in the AC terminal 9 of said converter 3 corresponding to a phase (phase T).

In some embodiments, such as in a preferred embodiment, for example, the arithmetic mean of the voltages of the AC terminals 9 with respect to the first terminal 1 of a converter 3 is made to be the same as a value less than or equal to a maximum value defined by the following equation:

$$Vmed\_max = V_{DCmin} - \frac{\sqrt{2}\sqrt{3}\,Vf}{2},$$

where
- $V_{med\_max}$ is the maximum value of the arithmetic mean associated with a converter 3,
- $V_{DCmin}$ is the smallest DC voltage $V_{DC}$ from among the measurements, and
- $V_f$ is the phase voltage of the power grid G.

In a preferred embodiment of the method, the DC voltage $V_{DC}$ between the two terminals 1 and 2 on the DC side 3C of each of the converters 3 is furthermore measured, said DC voltages $V_{DC}$ are compared, which of them is the smallest voltage is determined and the arithmetic means of the voltages of the AC terminals 9 of the different converters 3 are made equal based on the measured DC voltages $V_{DC}$, taking the arithmetic mean associated with the converter 3 the DC voltage $V_{DC}$ of which is smallest as a reference. In a preferred embodiment, the values of the arithmetic mean of all the converters 3 are made to be equal to the value of the measured arithmetic value of the converter 3 the DC voltage $V_{DC}$ of which is the smallest, although in other embodiments, said value can be modified as desired, making all the values of the arithmetic means equal to said modified value.

In a preferred embodiment, a current control such as the one described for the first aspect of an embodiment of the invention is furthermore implemented for eliminating zero-sequence currents therebetween, and it is implemented on all the converters 3 except for one.

The invention claimed is:

1. A power conversion system comprising:
a plurality of converters each having an alternating current (AC) side configured for coupling to a power grid and a direct current (DC) side configured for coupling to a plurality of DC sources, each converter comprising:
a first terminal and a second terminal each arranged on the DC side of said converter and configured for coupling to a corresponding one of the plurality of DC sources, one of said first and second terminals being a positive terminal and the other terminal being a negative terminal, and
a plurality of AC terminals arranged on the AC side of said converter,
wherein each of the AC terminals of the plurality of converters corresponding to a same phase is connected to a common AC point,
wherein each of the first terminals of the plurality of converters is grounded and each of the second terminals of the plurality of converters is coupled, independently of one another, to a corresponding one of the plurality of DC sources, and
wherein the first terminals of the plurality of converters are connected to one another at a grounded attachment point, or are grounded independently,
the power conversion system further comprising a control device configured to dynamically determine an arithmetic mean of voltages of the AC terminals of each of the plurality of converters with respect to the first terminal of the respective converter and control one or more of the plurality of converters to cause a value of the determined arithmetic mean to equal a determined value, said determined value being a first determined value that is greater than or equal to half a minimum DC voltage required at the first and second terminals on the DC side of the corresponding converter in the case that the first terminals of the converters are positive terminals, and said determined value is a second determined value, having a sign opposite to a sign of the first determined value, that is greater than or equal to half the minimum DC voltage required at the first and second terminals on the DC side of the corresponding converter in the case that the first terminals of the converters are negative terminals.

2. The power conversion system according to claim 1, further comprising at least one detection device configured for measuring a DC voltage between the first and second terminals on the DC side of each of the plurality of converters, the control device configured to communicate with the detection device for receiving said measured DC voltages and configured for dynamically determining the arithmetic mean of the voltages of the AC terminals of each of the plurality of converters and for performing said control of the one or more converters based on said measured DC voltages and on a common-mode voltage of each converter.

3. The power conversion system according to claim 2, wherein the arithmetic mean of the voltages of the AC terminals of each of the plurality of converters is less than or equal to a maximum value defined by the equation $$Vmed\_max = V_{DCmin} - \frac{\sqrt{2}\sqrt{3}\,Vf}{2},$$

where
Vmed_max is a maximum value of the arithmetic mean associated with a converter,
VDCmin is a smallest DC voltage from among the measured DC voltages, and
Vf is a phase a voltage of the power grid.

4. The power conversion system according to claim 3, wherein the control device is further configured for determining which of the measured DC voltages is the smallest voltage and for performing said control of the one or more converters based on the arithmetic mean associated with the converter having the determined smallest DC voltage as a reference.

5. The power conversion system according to claim 2, wherein the control device is further configured to implement in a dynamic manner, on all the converters except for one, a current control for eliminating zero-sequence currents therebetween.

6. The power conversion system of claim 1, wherein each of the plurality of DC sources has a capacity and is configured to operate independently of the other DC sources, and the plurality of converters are configured to utilize the capacity of each of the DC sources.

7. A method for controlling a power conversion system having a plurality of converters each having an alternating current (AC) side configured for coupling to a power grid and a direct current (DC) side configured for coupling to a plurality of DC sources, each converter comprising:
a first terminal and a second terminal each arranged on the DC side of said converter and configured for coupling to a corresponding one of the plurality of DC sources, one of said first and second terminals being a positive terminal and the other terminal being a negative terminal, and
a plurality of AC terminals arranged on the AC side of said converter,
wherein each of the AC terminals of the plurality of converters corresponding to a same phase is connected to a common AC point,
wherein each of the first terminals of the plurality of converters is grounded and each of the second terminals of the plurality of converters is coupled, independently of one another, to a corresponding one of the plurality of DC sources, the method comprising:
controlling each of the plurality of DC sources, each having a capacity, independently of the rest of the plurality of DC sources such that the capacity of each of the sources is utilized; and
determining an arithmetic mean of the voltages of the AC terminals of each of the plurality of converters with respect to the respective first terminal of the respective converter and controlling one or more of the plurality of converters to cause a value of the determined arithmetic mean to equal a first value greater than or equal to half a minimum DC voltage required at the first and second terminals on the DC side of the corresponding converter in the case that the first terminals of the converters are positive terminals, and equal to a second value, having a sign opposite to a sign of the first value, that is greater than or equal to half the minimum DC voltage required at the first and second terminals on the DC side of the corresponding converter in the case that the first terminals of the converters are negative terminals.

8. The method according to claim 7, further comprising measuring the DC voltage between the first and second terminals on the DC side of each of the plurality of converters, obtaining the arithmetic mean of the voltages of the AC terminals of each of the plurality of converters, and performing said control of the one or more converters based on said measured DC voltages and on a common-mode voltage of each converter.

9. The method according to claim 8, wherein the control of the one or more converters is performed to cause the arithmetic mean of the voltages of the AC terminals to equal a value less than or equal to a maximum value defined by the equation $$\text{Vmed\_max} = V_{DCmin} - \frac{\sqrt{2}\sqrt{3}\,V_f}{2},$$

where
Vmed_max is a maximum value of the arithmetic mean associated with a converter (3),
VDCmin is a smallest DC voltage from among the measured DC voltages, and
Vf is a phase voltage of the power grid.

10. The method according to claim 9, further comprising determining which of the measured DC voltages is the smallest voltage and performing said control of the one or more converters based on the arithmetic mean associated with the converter having the determined smallest DC voltage as a reference.

11. The method according to claim 8, further comprising implementing a current control on all the converters except for one, to eliminate zero-sequence currents therebetween.

12. The power conversion method of claim 7, wherein each of the plurality of DC sources has a capacity and is configured to operate independently of the other DC sources, and the plurality of converters are configured to utilize the capacity of each of the DC sources.

13. A power conversion system comprising:
a plurality of converters each having an alternating current (AC) side configured for coupling to a power grid and a direct current (DC) side configured for coupling to a plurality of DC sources, each converter comprising:
a first terminal and a second terminal each arranged on the DC side of said converter and configured for coupling to a corresponding one of the plurality of DC sources, one of said first and second terminals being a positive terminal and the other terminal being a negative terminal, and
a plurality of AC terminals arranged on the AC side of said converter,
wherein each of the AC terminals of the plurality of converters corresponding to a same phase is connected to a common AC point,
wherein each of the first terminals of the plurality of converters is grounded and each of the second terminals of the plurality of converters is coupled, independently of one another, to a corresponding one of the plurality of DC sources;
a control device configured to dynamically determine an arithmetic mean of voltages of the AC terminals of each of the plurality of converters with respect to the first terminal of the respective converter and control one or more of the plurality of converters to cause a value of the determined arithmetic mean to equal a determined value, said determined value being a first determined value that is greater than or equal to half a minimum DC voltage required at the first and second terminals on the DC side of the corresponding converter in the case that the first terminals of the converters are positive terminals, and said determined value is a second determined value, having a sign opposite to a sign of the first determined value, that is greater than or equal to half the minimum DC voltage required at the first and second terminals on the DC side of the corresponding converter in the case that the first terminals of the converters are negative terminals.

14. The power conversion system according to claim 13, further comprising at least one detection device configured for measuring a DC voltage between the first and second terminals on the DC side of each of the plurality of converters, the control device configured to communicate with the detection device for receiving said measured DC voltages and configured for dynamically determining the arithmetic mean of the voltages of the AC terminals of each of the plurality of converters and for performing said control of the one or more converters based on said measured DC voltages and on a common-mode voltage of each converter.

15. The power conversion system according to claim 14, wherein the arithmetic mean of the voltages of the AC terminals of each of the plurality of converters is less than or equal to a maximum value defined by the equation $$\text{Vmed\_max} = V_{DCmin} - \frac{\sqrt{2}\sqrt{3}\,Vf}{2},$$

where

Vmed_max is a maximum value of the arithmetic mean associated with a converter,

VDCmin is a smallest DC voltage from among the measured DC voltages, and

Vf is a phase a voltage of the power grid.

16. The power conversion system according to claim 15, wherein the control device is further configured for determining which of the measured DC voltages is the smallest voltage and for performing said control of the one or more converters based on the arithmetic mean associated with the converter having the determined smallest DC voltage as a reference.

17. The power conversion system of claim 13, wherein each of the plurality of DC sources has a capacity and is configured to operate independently of the other DC sources, and the plurality of converters are configured to utilize the capacity of each of the DC sources.

18. The power conversion system according to claim 14, wherein the control device is further configured to implement in a dynamic manner, on all the converters except for one, a current control for eliminating zero-sequence currents therebetween.

* * * * *